Oct. 13, 1953     L. FULLER ET AL     2,655,552
SEPARATOR FOR ELECTRIC SECONDARY BATTERIES
Filed Aug. 30, 1949
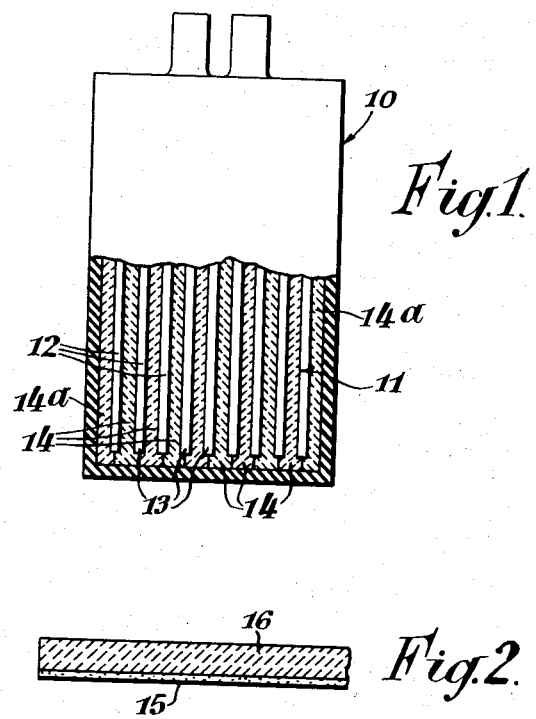
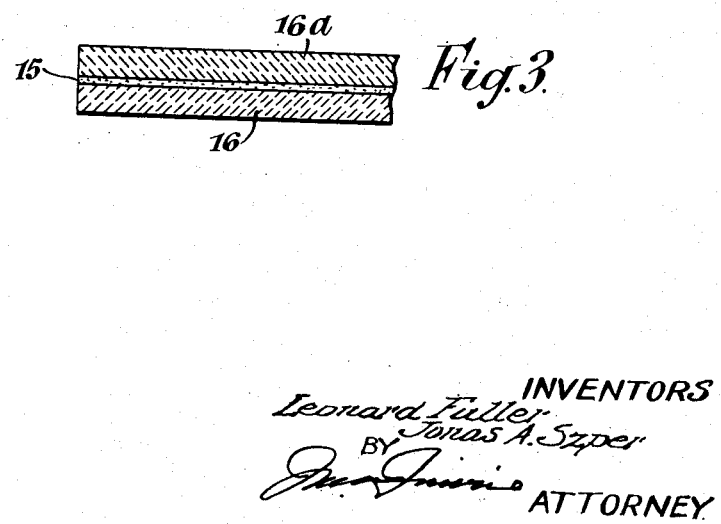
INVENTORS
Leonard Fuller
Jonas A. Szper
BY
ATTORNEY Patented Oct. 13, 1953

2,655,552

UNITED STATES PATENT OFFICE 2,655,552

SEPARATOR FOR ELECTRIC SECONDARY BATTERIES

Leonard Fuller, London, and Jonas Abraham Szper, Barking, England, assignors, by mesne assignments, to Leonard Fuller, London, and Edmund William Sudlow, Berkeley Gardens, England, jointly Application August 30, 1949, Serial No. 113,078
In Great Britain August 30, 1948

3 Claims. (Cl. 136—145)

This invention relates to separators for electric secondary batteries, and more particularly to those for batteries known as dry secondary batteries in which all the electrolyte is absorbed and adsorbed in the porous pasted plates conjointly with very porous separators occupying the whole of the spaces between the plates.

The separators in such batteries must possess several contradictory characteristics. They must be very porous and absorbent and at the same time they must be mechanically strong and their structure must be such as to prevent particles of both positive and negative active materials penetrating into them. Furthermore, the absorbency of the separator must not be due to the capillarity only, because the amount of acid absorbed by the separator would not be sufficient to allow economical discharge and capacity of the resulting battery. Furthermore, the small channels in such separators could in certain conditions get dry, with the result that the conductivity and contact between the active material and the separator would vary according to the degree of moisture in the separator. Further, it is obvious that the material of the separator, other than the included reinforcing media, must be acid resisting, and its decomposition products, if any, must not react with or on the active materials or the electrolyte so as to be detrimental to the performance and/or the life of the battery.

From the foregoing, it seems clear that separators for a dry storage battery must be not only absorbent, but also adsorbent, and the distances between the particles or fibres constituting the separator mass must be sufficiently small to discourage evaporation of the electrolyte. In this connection porous rubber and micro-porous rubber and ebonite separators have been found to be deficient for use in dry lead-acid batteries. On the other hand, kieselguhr powder, aluminium oxide, aluminium silicates and powdered ceramic have all the necessary properties for a good separating material but by themselves, they cannot be used in plate type batteries, owing to assembly difficulties. Such porous acid-proof insulating materials having absorbent and adsorbent properties are herein termed "the absorbent."

It is the object of the invention to provide an improved method of producing, and construction of, sheet separating material for use between the plates of a so-called dry secondary battery, which separating material is simple to manufacture, convenient to handle during assembly and also enables a more efficient dry secondary battery to be produced.

According to the invention, in a method of producing sheet separators for use between the plates of electric secondary batteries of the so-called dry type, powdered absorbent mixed with a fluid binder to form a paste, is applied in a layer to a flexible reinforcing sheet and is dried, the layer forming a porous fragile plate which is strengthened by the reinforcing layer until such time as the separator is wetted with electrolyte.

The improved method, according to another aspect of the invention, consists in taking a reinforcing sheet of thin flexible material, and applying thereto a thick layer of powdered absorbent mixed with a fluid binder, said layer being more than five times the thickness of the reinforcing sheet, and then causing the layer to harden, the layer forming a fragile plate and the sheet serving as substantial reinforcement for said plate until the separator is assembled dry between the electrode plates of a secondary battery. Preferably a layer of absorbent and binder is applied to each face of the reinforcing sheet, so that the latter is sandwiched.

There is further provided according to the invention, for an electric secondary battery of the so-called dry type, a separator in the form of a laminated plate comprising a relatively thin reinforcing sheet, and a main relatively thick layer of absorbent composed of powder held together by a binder, the reinforcing sheet serving to strengthen the main layer so long as the separator is kept dry, thus enabling said separator to be safely handled and assembled in the battery.

According to another aspect of the invention a laminated separator is provided, comprising in combination with a main layer of absorbent lightly held together by a binder, a reinforcing sheet having a thickness not greater than one fifth of the thickness of the main layer. The reinforcing sheet is preferably composed of porous flexible material, and is used in conjunction with a main layer of kieselguhr particles bound by prevulcanised rubber latex.

The thickness of the main layer can be as much as ten or even twenty times as thick as the reinforcing sheet.

It is found that this reinforcing sheet need not be acid-proof as its main function is to support the absorbent during manufacture and assembly. Therefore said sheet may advantageously be made of materials having a cellulosic origin, such as paper, filter paper, regenerated cellulose sheet (e. g. that known under the registered trade-mark "cellophane") alginic acid sheet, and muslin and like woven materials. The above materials can be very thin, so that their volume becomes very small, and may easily be less than 1% of the volume of the whole separator. As the porosity of a normal rubber-kieselguhr mix, when dry, is in the region of 90%, the porosity of the whole separator is increased substantially, by comparison with a separator of equal thickness having for reinforcement a layer of non-porous material such as glass wool. However, even if thick but porous materials are used, the overall porosity can still be greater than that of known glass wool separators coated with kieselguhr-rubber mix. This is due to the fact that glass wool sheets cannot be made to the desired extreme thinness and at the same time have the necessary mechanical strength, especially after compression. Moreover the glass fibres, of which the glass wool is composed, are completely non-porous and therefore constitute a volume which is quite ineffective as regards absorption (or adsorption) of electrolyte.

Typical separators according to the invention are illustrated in the accompanying diagrammatic drawings in which:

Figure 1 is a part-sectional elevation of a battery;

Figure 2 is an enlarged fragmentary sectional elevation of one of the sheet separators prior to assembly in the battery; and Figure 3 is a view similar to Figure 2, but showing a modified construction of separator.

The battery shown in Figure 1 is of the so-called dry type and comprises a rectangular casing 10 within which an electrode-separator block is tightly fitted. This block is indicated generally at 11 and comprises a number of negative pasted plates 12 arranged in a pack with alternate positive pasted plates 13, each plate being insulated from its adjoining plate or plates by separators in the form of flexible porous sheets 14; a similar separator 14a is also included between the outermost negative plates 12 and the casing 10. The electrode-separator block 11 occupies the whole interior space within the casing 10 (except perhaps for a free space at the top) and it is sufficiently porous to absorb the whole of the sulphuric acid electrolyte required for the proper operation of the battery.

The separators 14 and 14a are of the construction shown in Figure 2 in order to combine the desired maximum porosity with sufficient mechanical stability to enable the separators to be handled and assembled in the battery without undue damage. The thickness as shown is exaggerated. The separator comprises a reinforcing sheet 15 of porous paper to which the absorbent or separating material proper is applied as a layer 16. In the modified separator shown in Figure 3 a second layer 16a is applied to the opposite surface of the reinforcing sheet 15 after the first layer 16 has been dried and the sheet inverted, the reinforcing sheet 15 thus being sandwiched.

The substance used for coating the porous supporting sheets to form the layer 16 (or layers 16, 16a) is composed of two main parts, namely (1) the absorbent, and (2) the binder. Kieselguhr, aluminium oxide, aluminium silicates and powdered ceramic materials have been found satisfactory for the absorbent, which must be finely powdered and have highly developed surfaces to produce the desired texture in the finished separator. The binding material is preferably present in the discontinuous phase, its nature being such that when the water suspension comprising the mixed filler and the binder is dried out no vulcanization or similar operations are necessary. From this it is clear that a pre-vulcanized rubber latex or a synthetic latex not requiring vulcanization is very desirable, and it has been found that pre-vulcanized rubber latex, which produces (after drying) a resilient soft film gives very satisfactory results. It will be noted that, if vulcanizing ingredients have to be added they become scattered throughout the whole mass of the filler with little probability of their reacting with the binder; this means that a great excess of the vulcanizing agent (which is sulphur in the case of rubber) has to be used, and the surplus free vulcanizing ingredients will subsequently be present in the finished separator to affect the operation of the battery detrimetally. Metamethacrylate, polyvinyl chloride and other synthetic plastics, capable of giving an emulsion or discontinuous suspension, can be also successfully used as binder. To conserve high porosity it is desirable that the quantity of binding material should not exceed 15% of the total by weight.

In one method of carrying the invention into effect, a paste is prepared as follows:

.5 lb. of gum karaya is dissolved in 25 gallons of distilled water.

90 lbs. of kieselguhr is added and the paste mixed until homogeneous and then 17 lbs. of 60% pre-vulcanized rubber latex is added slowly. A slow moving stirrer must be used so as not to provoke a coagulation of the latex during the stirring. The mix thus prepared must be kept stirred to prevent deposition of the kieselguhr and it can be extruded, pasted, spread, sprayed, brushed or poured on to the reinforcing sheets, which are preferably thin, porous unsized paper.

When using regenerated cellulose sheet as the reinforcing sheet it may be as thin as .001 inch; alginic acid sheet may be even thinner, while the most suitable thickness for paper varies from .003 inch to .01 inch depending upon the mechanical strength when wet. After drying, the composite separator sheet may be compressed to the desired thickness, keeping in mind that the final porosity must be maintained as high as possible without impairing the mechanical strength of the separator. Once the separator has been compressed between the plates during assembly of the battery it is immaterial whether the reinforcing sheet is destroyed by the sulphuric acid electrolyte, provided that no materials are produced which deleteriously affect the performance of the battery.

We claim:

1. A space filling separator for use in secondary batteries of the dry type wherein the electrolyte is absorbed in the separators, said separator comprising a laminate consisting of a relatively thick layer of powdered absorbent lightly held together by a binder and supported on a relatively thin sheet of absorbent paper which is initially impervious to passage of the absorbent powder thereinto or therethrough and yet is subject to ultimate dissolution in the electrolyte of a battery assembly, said layer of powdered absorbent being composed of kieselguhr particles bound together by approximately fifteen per cent by weight of pre-vulcanized rubber latex.

2. A space filling separator for use in secondary batteries of the dry type wherein the electrolyte is absorbed in the separators, said separator comprising a laminate consisting of a relatively thick layer of powdered absorbent lightly held together by a binder and supported on a relatively thin sheet of absorbent paper which is initially impervious to passage of the absorbent powder thereinto or therethrough and yet is subject to ultimate dissolution in the electrolyte of a battery assembly, said layer of powdered absorbent being applied at one face only of the paper and lightly held together by a discontinuous binder constituting not more than fifteen per cent of the combined weight.

3. A space filling separator for use in secondary batteries of the dry type wherein the electrolyte is absorbed in the separators, said separator comprising a laminate consisting of a relatively thick layer of powdered absorbent lightly held together by a binder and supported on a relatively thin sheet of absorbent paper which is initially impervious to passage of the absorbent powder thereinto or therethrough and yet is subject to ultimate dissolution in the electrolyte of a battery assembly, the layer of the powdered absorbent comprising an applique at each face of the paper, the powdered absorbent in each said applique being lightly held together by a discontinuous binder constituting not more than fifteen per cent of the combined weight.

LEONARD FULLER.
JONAS ABRAHAM SZPER.

References Cited in the file of this patent

UNITED STATES PATENTS

| Number | Name | Date |
|---|---|---|
| 1,256,864 | Becker | Feb. 19, 1918 |
| 1,366,223 | Wales | Jan. 18, 1921 |
| 1,784,981 | Behrman | Dec. 16, 1930 |
| 1,942,183 | Muller | Jan. 2, 1934 |
| 2,043,954 | Kershaw | June 9, 1936 |
| 2,052,490 | Reinhardt et al. | Aug. 25, 1936 |
| 2,155,016 | Kershaw | Apr. 18, 1939 |
| 2,478,186 | Gerber | Aug. 9, 1949 |
| 2,484,787 | Grant | Oct. 11, 1949 |
| 2,508,043 | Schaeffer | May 16, 1950 |
| 2,511,887 | Vinal | June 20, 1950 |
| 2,526,591 | Szper | Oct. 17, 1950 |
| 2,543,137 | Uber | Feb. 27, 1951 |

FOREIGN PATENTS

| Number | Country | Date |
|---|---|---|
| 537,377 | Great Britain | June 19, 1941 |
| 540,591 | Great Britain | Oct. 22, 1941 |